United States Patent
Aihara et al.

(10) Patent No.: US 6,236,840 B1
(45) Date of Patent: May 22, 2001

(54) TRANSMISSION OUTPUT DETECTING CIRCUIT

(75) Inventors: Yukichi Aihara, Kawasaki; Fujio Sasaki, Yokohama, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/988,025

(22) Filed: Dec. 10, 1997

(30) Foreign Application Priority Data

Dec. 11, 1996 (JP) .................................................. 8-346458

(51) Int. Cl.[7] .............................. H04B 1/44; H04B 17/00
(52) U.S. Cl. .............................. 455/83; 455/15; 455/126; 455/67.1; 455/82; 370/280; 370/278; 370/282
(58) Field of Search .................................. 455/78, 80, 82, 455/83, 67.1, 115, 126, 79, 425; 370/280, 282, 278, 314, 277, 294, 241, 252

(56) References Cited

U.S. PATENT DOCUMENTS

| 5,442,811 | * | 8/1995 | Kobayashi et al. | 455/115 |
|---|---|---|---|---|
| 5,487,179 | * | 1/1996 | Larsson | 455/82 |
| 5,590,412 | * | 12/1996 | Sawai et al. | 455/82 |
| 5,590,419 | * | 12/1996 | Shimo | 455/127 |
| 5,680,395 | * | 10/1997 | Weaver, Jr. et al. | 370/331 |
| 5,819,165 | * | 10/1998 | Hulkko et al. | 455/115 |
| 5,923,647 | * | 7/1999 | Dolman et al. | 370/280 |
| 5,926,466 | * | 7/1999 | Ishida et al. | 370/280 |

FOREIGN PATENT DOCUMENTS 8-186506  7/1996  (JP) .................................. H04B/1/04

* cited by examiner

Primary Examiner—William G. Trost
Assistant Examiner—Rafael Perez-Gutierrez
(74) Attorney, Agent, or Firm—Pearne & Gordon LLP

(57) ABSTRACT

A transmission output detecting circuit for use in a radio transmitter-receiver of a TDD communication system having a TDD switch for connecting a transmission system to an antenna system in a transmitting period and for connecting a reception system to the antenna system in a receiving period; comprising a detection means for detecting transmission output on the basis of leakage power of the TDD switch in the transmitting period. The transmission output can be detected with low power consumption without making the transmission power branch out.

6 Claims, 2 Drawing Sheets

TRANSMISSION OUTPUT DETECTING CIRCUIT

BACKGROUND OF THE INVENTION

1. Field of the invention

The present invention relates to a transmission output detecting circuit used in a radio transmitter-receiver of a TDD (time-division duplexing) communication system, and particularly relates to such a transmission output detecting circuit in which loss of transmission power is eliminated when transmission output is detected.

2. Description of the related art

In mobile stations and base stations for mobile communication adopting a TDD communication system, the level of transmission power is changed adaptively so as to keep reception in the respective stations in the optimum level. For such a purpose, each of radio transmitter-receivers of these stations has a circuit for detecting its transmission output.

As shown in FIG. 4, a conventional radio transmitter-receiver of a TDD communication system having a transmission output detecting circuit has an antenna 1, an antenna filter 2 for restricting a signal band, a TDD switch 3 for switching connection between transmission and reception, a reception system constituted by a reception first-stage amplifier (reception top amplifier) 7 for amplifying a reception signal, a reception first mixer 8 for mixing an oscillation signal of a local oscillator 12 with the reception signal so as to convert the reception signal into a first intermediate frequency signal, an amplifier 9 for amplifying the first intermediate frequency reception signal, a reception second mixer 10 for converting the output of the amplifier 9 into a second intermediate frequency signal, and a demodulator 11 for demodulating the second intermediate frequency reception signal to a base band signal, a transmission system constituted by a modulator 6 for modulating a transmission signal, a transmission mixer 5 for mixing the oscillation signal of the local oscillator 12 with the modulated transmission signal so as to convert the transmission signal into a radio frequency signal, and a transmission power amplifier 4 for amplifying transmission power, and a transmission output detecting circuit belonging to this transmission system and constituted by a directional coupler 13 for making a portion of the transmission signal branch out, and a detector 14 for diode-detecting the branching transmission signal.

The TDD switch 3 of this radio transmitter-receiver is a high-frequency switch which is constituted by an FET, an PIN diode or the like, and performs switching between transmission and reception at a high speed in response to a control signal applied thereto. In a receiving period, a signal received through the antenna 1 is inputted to the reception top amplifier 7 through the antenna filter 2 and the TDD switch 3, and demodulated to a base band signal by the system constituted by the reception first mixer 8, the amplifier 9, the second mixer 10, and the demodulator 11.

On the other hand, in a transmitting period, a transmission signal modulated by the modulator 6 is converted into a radio frequency signal by the transmission mixer 5, amplified by the transmission power amplifier 4, and then transmitted from the antenna 1 through the TDD switch 3 and the antenna filter 2.

At that time, a part of the output of the transmission power amplifier 4 is branched out by the directional coupler 13, and performed diode-detection by the detector 14, so that the transmission output is detected. The level of the transmission power is adjusted by this detection output.

Instead of providing the directional coupler, a part of the transmission output may be simply extracted by capacity coupling.

In a conventional transmission output detecting circuit, however, a part of transmission output is extracted through a directional coupler or a capacity coupling connected to the output of a transmission power amplifier, so that a loss is caused in the transmission power and it becomes necessary to amplify the transmission power correspondingly.

Specifically, the detector 14 requires a power of about 10 dBm at maximum in accordance with the relationship between the detection sensitivity and the dynamic range of the detection circuit. Accordingly, measures are taken such that allowing for such a loss, the output is increased correspondingly in the power amplifier 4, or in the case of a comparatively middle or small power radio station the transmission power of which is 20 dBm or less, the transmission output extracted by the directional coupler 13 is amplified by an amplifier 15 before the transmission output is detected by the detector 14 as shown in FIG. 5, since the insertion loss is increased by the increase of the coupling factor of the directional coupler.

In either case, the conventional transmission output detecting circuit has a problem that its current consumption is increased at the time of transmission, and its circuit configuration is complicated.

SUMMARY OF THE INVENTION

In order to solve the foregoing problems, it is an object of the present invention to provide a transmission output detecting circuit in which transmission power can be detected by a simple circuit configuration without increasing a transmission current.

The transmission output detecting circuit of the present invention is provided with a detecting means for detecting a transmission output on the basis of leakage power of a TDD switch in a transmitting period.

It is therefore possible to detect transmission output without making transmission power branch out, while preventing the power consumption from increasing.

In order to achieve the above object, according to an aspect of the present invention, provided is a transmission output detecting circuit for use in a radio transmitter-receiver of a TDD communication system having a TDD switch for connecting a transmission system to an antenna system in a transmitting period and for connecting a reception system to the antenna system in a receiving period; comprising a detection means for detecting transmission output on the basis of leakage power of the TDD switch in the transmitting period. Accordingly, it is possible to detect the transmission output without making transmission power branch out.

Preferably, a switch means is provided for supplying the detection means with, only in the transmitting period, an output of a first-stage amplifier of the reception system into which the leakage power of the TDD switch is inputted. The leakage power to be detected is amplified by the first-stage amplifier of the reception system. Accordingly, it is not necessary to provide newly another amplifier for detecting the transmission output.

Preferably, the switch means is constituted by a single-pole double-throw switch synchronizing with the TDD switch so as to supply the output of the first-stage amplifier of the reception system to a next-stage circuit of the reception system in the receiving period, and supply the output of the first-stage amplifier of the reception system to the detection means in the transmitting period. The next-stage circuit of the reception system and the detection means are selected alternately by this single-pole double-throw switch.

Preferably, the switch means is constituted by two single-pole single-throw switches synchronizing with the TDD switch so as to supply the output of the first-stage amplifier of the reception system to a next-stage circuit of the reception system in the receiving period, and supply the output of the first-stage amplifier of the reception system to the detection means in the transmitting period. These two single-pole single-throw switches synchronize with each other so as to function as one single-pole double-throw switch.

Preferably, the switch means is constituted by a single-pole single-throw switch inserted to a branch path branching-out from a connection path between the first-stage amplifier and a next-stage circuit of the reception system and synchronized with the TDD switch so as to turn off in the receiving period while turn on in the transmitting period to thereby supply out the output of the first-stage amplifier of the reception system to the detection means. Accordingly, it is possible to avoid the loss caused by the insertion of the switch at the time of reception. In addition, it is possible to make the configuration of the switch simple.

Preferably, a matching means is inserted between the single-pole single-throw switch and the detection means. It is possible to improve the detecting efficiency of the transmission output.

DETAILED DESCRIPTION OF THE PREFERRED EMBODIMENTS

Embodiments of the present invention will be described below with reference to the drawings.

First Embodiment

Figure 1:
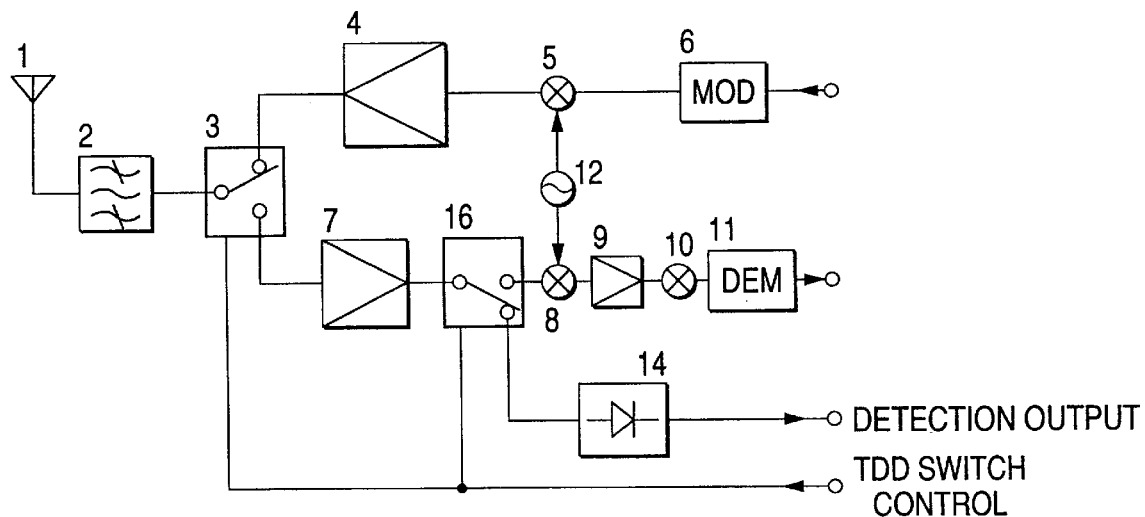
FIG. 1 is a block diagram illustrating the configuration of a transmission output detecting circuit in a first embodiment of the present invention.

As shown in FIG. 1, a radio transmitter-receiver having a transmission output detecting circuit in a first embodiment has an antenna 1, an antenna filter 2 for restricting a signal band, a TDD switch 3 constituted by an FET or the like and for switching connection between transmission and reception, a transmission system constituted by a modulator 6 for modulating a transmission signal, a transmission mixer 5 for mixing an oscillation signal of a local oscillator 12 with the modulated transmission signal so as to convert the transmission signal into a radio frequency signal, and a transmission power amplifier 4 for amplifying transmission power, and a reception system constituted by a low-noise reception first-stage amplifier (reception top amplifier) 7 for amplifying a reception signal, a single-pole double-throw (SPDT) switch 16 for synchronizing with the TDD switch 3 so as to switch the connection, a reception first mixer 8 for converting the reception signal into a first intermediate frequency signal, an amplifier 9 for amplifying the output of the reception first mixer 8, a reception second mixer 10 for converting the output of the amplifier 9 into a second intermediate frequency signal, a demodulator 11 for demodulating the second intermediate frequency reception signal to a base band signal, and a detector 14 for detecting transmission output on the basis of leakage power of the TDD switch 3 in a transmitting period introduced by the SPDT switch 16.

In this transmitter-receiver, the TDD switch 3 and the SPDT switch 16 are switched synchronously on the basis of a TDD control signal, so that, in a receiving period, the TDD switch 3 is connected to the reception top amplifier 7 side, while the SPDT switch 16 is connected to the reception first mixer 8 side. Therefore, a signal received by the antenna 1 is demodulated into a base band signal by the demodulator 11, through the antenna filter 2, the TDD switch 3, the reception top amplifier 7, the SPDT switch 16, the reception first mixer 8, the amplifier 9 and the reception second mixer 10.

On the other hand, in a transmitting period, the TDD switch 3 is connected to the transmission power amplifier 4 side, while the SPDT switch 16 is connected to the detector 14 side. Therefore, a transmission signal modulated by the modulator 6 is transmitted from the antenna 1, through the transmission mixer 5, the transmission power amplifier 4, the TDD switch 3 and the antenna filter 2.

At that time, a portion of transmission power leaks from the TDD switch 3 constituted by an FET or the like, and this leaking transmission power is amplified by the low-noise reception top amplifier 7. Then, the amplified signal is supplied to the detector 14 through the SPDT switch 16 so as to be detected by and outputted from the detector 14. This detection output shows a value proportional to the level of the transmission power.

Therefore, in this circuit, it is possible to detect the level of the transmission power without making the transmission power branch out.

Since it is not necessary to make the transmission power branch out for the detection of the transmission power, the power consumption can be reduced in this transmission output detecting circuit. However, the power supply for the reception top amplifier 7 must be turned on even in a transmitting period, so that the power consumption in the reception top amplifier 7 increases. However, this increase of the power consumption in the reception top amplifier 7 is much smaller than the increase of the power consumption in the transmission power amplifier 4 when the transmission output is detected by making the transmission power branch out. Therefore, the power consumption can be reduced as a whole.

The operation of the transmission output detecting circuit at the time of transmission will be described by using specific numerical value levels. Assume that the transmission power supplied to the antenna 1 is 15 dBm, and the sum of the loss in the TDD switch 3 and the loss in the antenna filter 2 is 5 dB. Then, the output of the transmission power amplifier 4 becomes 20 dBm.

In addition, assuming that the isolation of the TDD switch 3 is 20 dB, 0 dBm is inputted to the reception top amplifier 7 of which the gain is 8 dB, and assuming that the loss in the SPDT switch 16 is 1 dB, 7 dBm is inputted to the detector 14, so that a sufficient detection voltage can be obtained.

In order to obtain the same power of 7 dBm in a directional coupler like in the conventional example, the coupling factor of the directional coupler must be about −13 dB because 20−7=13. In order to make the transmission power amplifier 4 output 7 dBm (5 mW) extra, the power consumption must be increased by 50 mW when the power conversion efficiency is 10%.

On the other hand, the power consumption of the reception top amplifier 7 is about 3 V×5 mA=15 mW. In the present invention, therefore, the power consumption is smaller than that in the conventional example. In practice, there is a line conductor loss or the like in a transmission circuit around the directional coupler, so that the difference of the power consumption becomes larger.

As has been described, in the transmission output detecting circuit in this embodiment, it is possible to detect transmission power with less power consumption.

In the conventional transmission output detecting circuit using the directional coupler, the traveling wave power is extracted selectively so that it is possible to eliminate the influence of transmission power reflected on the antenna 1. In the present invention, however, the extraction of the transmission power depends only on the isolation between terminals of the TDD switch 3 so that the travelling direction of extraction of transmission power is not always specified into only one. In the radio transmitter-receiver using the transmission output detecting circuit in the present invention, however, the filter 2 which is used for transmission and reception in common is inserted between the TDD switch 3 and the antenna 1 in order to perform communication of the TDD system. When the loss in this filter 2 is 3 dB, the influence of a reflected wave is −6 dB in the TDD switch 3. Therefore, so long as the antenna 1 is normally connected, there is no fear that any significant error is caused in the detection of transmission power by the reflection on the antenna 1.

Figure 2A:
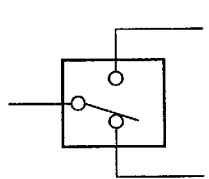
FIGS. 2A and 2B are views for explaining a switch used in the transmission output detecting circuit in the first embodiment.
Figure 2B:
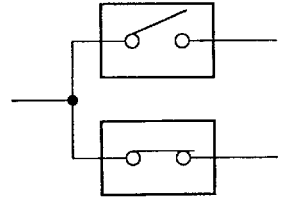

In addition, the switch 16 provided in the posterior stage of the reception top amplifier 7 may be a single-pole double-throw (SPDT) switch or two single-pole single-throw (SPST) switches as shown in FIGS. 2A and 2B respectively.

Second Embodiment

Figure 3:
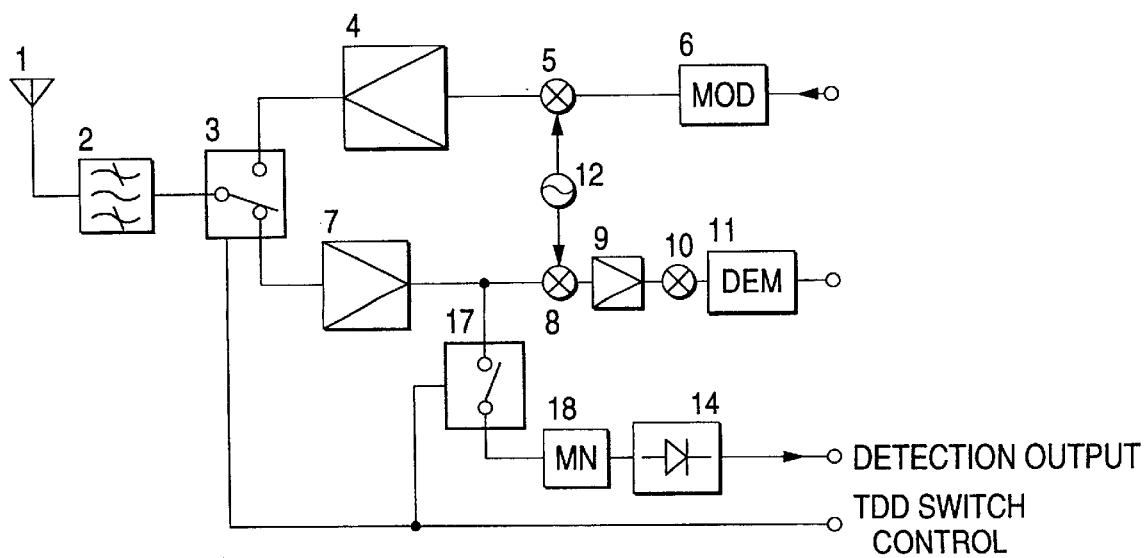
FIG. 3 is a block diagram illustrating the configuration of a transmission output detecting circuit in a second embodiment of the present invention.
Figure 4:
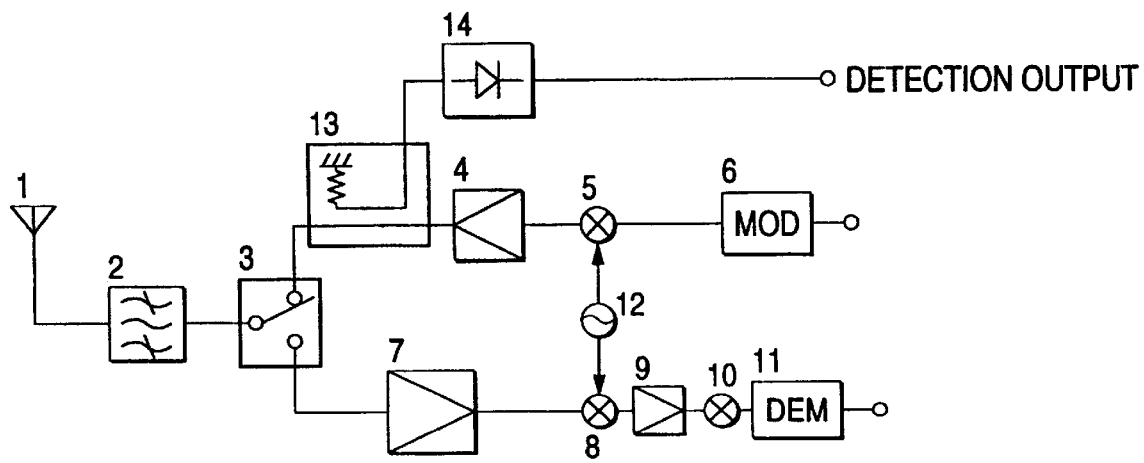
FIG. 4 is a block diagram illustrating the configuration of a conventional transmission output detecting circuit.
Figure 5:
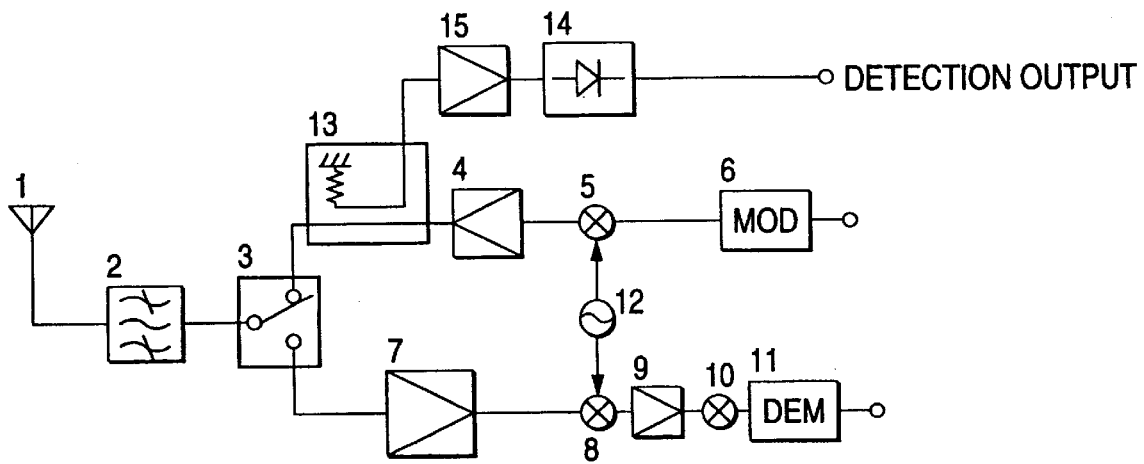
FIG. 5 is a block diagram illustrating the configuration of another conventional transmission output detecting circuit.

In a radio transmitter-receiver having a transmission output detecting circuit in a second embodiment, as shown in FIG. 3, the reception top amplifier 7 and the reception first mixer 8 are connected to each other directly. In addition, there are provided an SPST switch 17 for supplying the amplification output of the reception top amplifier 7 to the detector 14 side selectively, and a matching circuit 18 disposed, in accordance with necessity, in order to make matching of the connection of the detector 14. The other configuration is the same as that in the first embodiment (FIG. 1).

The SPST switch 17 in this radio transmitter-receiver turns on/off by synchronizing with the TDD switch 3, so that in a receiving period the TDD switch 3 is connected to the reception top amplifier 7 side, while the SPST switch 17 turns off at the same time. Therefore, a signal received by the antenna 1 is demodulated into a base band signal by the demodulator 11 through the antenna filter 2, the TDD switch 3, the reception top amplifier 7, the reception first mixer 8, the amplifier 9 and the reception second mixer 10.

In a transmitting period, on the other hand, the TDD switch 3 is connected to the transmission power amplifier 4 side, while the SPST switch 17 turns on at the same time.

Therefore, a transmission signal modulated by the modulator 6 is transmitted from the antenna 1 through the transmission mixer 5, the transmission power amplifier 4, the TDD switch 3 and the antenna filter 2.

At that time, a part of transmission power leaking from the TDD switch 3 is amplified by the reception top amplifier 7, supplied to the detector 14 through the SPST switch 17 and the matching circuit 18, and then detected by and outputted from the detector 14. This detection output shows a value proportional to the level of the transmission power.

Since the switch 17 itself performs only an ON/OFF operation in this transmission output detecting circuit, the configuration thereof is made simple. In addition, since no insertion loss of a switch is generated between the reception top amplifier 7 and a next-stage circuit at the time of reception, there is an advantage that the reception characteristic becomes superior. However, since the reception top amplifier 7 is connected to the turned-off-state next-stage circuit of the reception system also in the transmitting period, the matching circuit 18 is provided, in accordance with necessity, in order to improve the detection efficiency.

As is apparent from the above description, a transmission output detecting circuit according to the present invention can detect transmission output with less power consumption, and this detection circuit can be realized by a simplified circuit configuration.

Particularly, it is possible to provide a detection circuit suitable for a transmitting/receiving circuit, such as a millimeter band circuit, in which it is not easy to make the output power of a power amplifier high and in which simplification of the circuit is required.

What is claimed is:

1. A transmission output detecting circuit for use in a radio transmitter-receiver of a TDD communication system, comprising:

a TDD switch for connecting a transmission system to an antenna system in a transmitting period and for connecting a reception system to said antenna system in a receiving period;

a detection means for detecting transmission output on the basis of leakage power of said TDD switch in the transmitting period.

2. A transmission output detecting circuit as claimed in claim 1, wherein a switch means is provided for supplying said detection means with, only in the transmitting period, an output of a first-stage amplifier of said reception system into which said leakage power of said TDD switch is inputted.

3. A transmission output detecting circuit as claimed in claim 2, wherein said switch means is constituted by a single-pole double-throw switch synchronizing with said TDD switch so as to supply the output of said first-stage amplifier of said reception system to a next-stage circuit of said reception system in the receiving period, and supply the output of said first-stage amplifier of said reception system to the detect ion means in said transmitting period.

4. A transmission output detecting circuit as claimed in claim 2, wherein said switch means is constituted by two single-pole single-throw switches synchronizing with said TDD switch so as to supply the output of said first-stage amplifier of said reception system to a next-stage circuit of said reception system in the receiving period, and supply the output of said first-stage amplifier of said reception system to said detection means in the transmitting period.

5. A transmission output detecting circuit as claimed in claim 2, wherein said switch means is constituted by a single-pole single-throw switch inserted to a branch path branching-out from a connection path between said first-stage amplifier and a next-stage circuit of said reception system and synchronized with said TDD switch so as to turn off in the receiving period while turn on in the transmitting period to thereby supply out the output of said first-stage amplifier of said reception system to said detection means.

6. A transmission output detecting circuit as claimed in claim 5, wherein a matching means is inserted between said single-pole single-throw switch and said detection means.

* * * * *

UNITED STATES PATENT AND TRADEMARK OFFICE
CERTIFICATE OF CORRECTION

PATENT NO.   : 6,236,840 B1                                        Page 1 of 1
DATED         : May 22, 2001
INVENTOR(S)   : Yukichi Aihara et al.

It is certified that error appears in the above-identified patent and that said Letters Patent is hereby corrected as shown below:

Title page,
Item [54], delete "TRANSMISSION OUTPUT DETECTING CIRCUIT", and insert -- RADIO TRANSCEIVER WITH A TRANSMISSION OUTPUT DETECTING CIRCUIT FOR DETECTING TRANSMISSION OUTPUT POWER FROM LEAKAGE POWER OD A TDD SWITCH IN A TRANSMITTING PERIOD --.

Item [75], after "Kawasaki", insert -- -shi --.
After "Yokohama", insert -- -shi --.
Line 5, after "system" (second occurrance), insert -- and --.

Signed and Sealed this

Eighteenth Day of December, 2001

Attest:

Attesting Officer

JAMES E. ROGAN
*Director of the United States Patent and Trademark Office*